US009010055B2

(12) United States Patent
Orszulak et al.

(10) Patent No.: US 9,010,055 B2
(45) Date of Patent: *Apr. 21, 2015

(54) EXTRA STRENGTH BACKING STUD HAVING NOTCHED FLANGES

(71) Applicants: Leszek Orszulak, Auburn, WA (US); Jaroslaw Sydry, Auburn, WA (US)

(72) Inventors: Leszek Orszulak, Auburn, WA (US); Jaroslaw Sydry, Auburn, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/248,307

(22) Filed: Apr. 8, 2014

(65) Prior Publication Data

US 2014/0360113 A1 Dec. 11, 2014

Related U.S. Application Data

(63) Continuation of application No. 12/427,898, filed on Apr. 22, 2009, now Pat. No. 8,689,508.

(60) Provisional application No. 61/056,513, filed on May 28, 2008.

(51) Int. Cl.
| | |
|---|---|
| *E04B 1/94* | (2006.01) |
| *E04B 2/56* | (2006.01) |
| *E04C 2/42* | (2006.01) |
| *E04B 2/58* | (2006.01) |
| *E04B 1/24* | (2006.01) |
| *G06F 13/42* | (2006.01) |

(52) U.S. Cl.
CPC ............... *E04B 2/58* (2013.01); *G06F 13/4243* (2013.01); *E04B 1/24* (2013.01); *E04C 2/423* (2013.01)

(58) Field of Classification Search
CPC . E04B 2/789; E04B 1/948; E04B 2001/2496; E04B 1/24; E04B 1/246; E04B 2/581; E04C 2003/0473; E04C 2/423
USPC ............. 52/317, 666–668, 763, 779, 27, 349, 52/481.1, 696, 697
See application file for complete search history.

(56) References Cited

U.S. PATENT DOCUMENTS

| 3,010,162 | A | * | 11/1961 | Klein | ............................. | 52/696 |
| 4,843,726 | A | * | 7/1989 | Ward | ............................. | 33/613 |
| 5,964,072 | A | * | 10/1999 | Rasmussen | .................... | 52/666 |
| 6,253,529 | B1 | * | 7/2001 | De Boer | ......................... | 52/763 |

(Continued)

OTHER PUBLICATIONS

Timothy J. Waite, Steel-Frame House Construction, 2000, p. 152, prepared for Craftsman Book Company by the NAHB Research Center, CArlsbad, CA U.S.A.
Unknown Author, "Typical Interior Detail" Plan Sheet, Evergreen State College, Olympia, WA U.S.A., Detail 1/A9.1.2—Partition Bracing, 2005.

(Continued)

*Primary Examiner* — William Gilbert
(74) *Attorney, Agent, or Firm* — Thomas E Loop

(57) ABSTRACT

Disclosed herein is an elongated C-shaped backing stud having a plurality of receiving notches positioned along its outer flanges. The backing stud is fastened to the studs of a sheet metal wall assembly by means of a plurality of fasteners, and such that the plurality of studs of the wall assembly abuts a planar web portion of the backing stud. The backing stud may be characterized in that (i) the ratio of the width of the web portion to the width of the backing stud flanges ranges from about 8 to 16, (ii) the ratio of the width of the backing stud flanges to width of the outer returns is at least about one, and (iii) the ratio of the width of the plurality of studs to the width of the outer returns ranges from about 6 to 8. The backing stud is configured to support wall hung grab bars, hand rails, cabinets, shelves, and the like.

1 Claim, 4 Drawing Sheets

(56) References Cited

U.S. PATENT DOCUMENTS 7,520,100 B1 * 4/2009 Herrman et al. ............. 52/481.1
8,689,508 B2 * 4/2014 Orszulak et al. ................ 52/317

OTHER PUBLICATIONS

Unknown Author, A Builders Guide to Steel Frame Construction, 2007, p. 8, Steel Framing Alliance, Washington DC U.S.A.

* cited by examiner

EXTRA STRENGTH BACKING STUD HAVING NOTCHED FLANGES

TECHNICAL FIELD

The present invention relates generally to building construction and, more specifically, to structural sheet metal backing studs or members for supporting wall hung grab bars, hand rails, cabinets, shelves, and the like. The extra strength sheet metal backing stud of the present invention allows for a secure attachment and support for objects that place a load on a wall assembly and/or wall sheathing.

BACKGROUND OF THE INVENTION

Framing associated with building walls has historically been assembled from wooden members, including wooden studs and beams. In more recent years, however, the use of metal studs together with confronting channeled track members has gained wide acceptance, especially in new commercial buildings such as office buildings. Generally speaking, metal studs and track members are stronger, more resistant to fire and economical than their wooden counterparts.

Metal studs are typically formed of galvanized sheet-metal bent to encompass a cross sectional area having nominal dimensions of two inches by four inches. To conform to modern architectural plans and building code requirements, metal studs are formed of sheet-metal bent into a generally U-shaped cross-section in which a relatively broad central base is flanked by a pair of narrower sides that are bent at right angles relative to the base. The central base typically has a uniform nominal width of either three and ⅝ or four inches and is commonly referred to as the web. The sides of the U-shaped stud typically extend outwardly from the base a nominal distance of two inches and are commonly referred to as flanges. In order to enhance the structural rigidity of the flanges, the ends of flanges are typically bent over into a plane parallel to and spaced apart from the plane of the web. The turned over edges of the flanges define marginal returns or lips that are typically ¼ to ½ inch in width.

During the framing of building walls, it is common practice to position wall studs at regularly spaced apart intervals relative to one another. For example, it is common practice to vertically position wall studs at 16 inches from center intervals. In addition, there is often a need for the studs to be transversely braced together, thereby providing enhanced structural rigidity to the frame-assembly. For example, studs over eight feet in length are generally transversely braced together to ensure adequate lateral stability of the wall structure. Exemplary devices that assist with the proper spacing and bracing of at least metal studs include those devices disclosed in U.S. Pat. No. 1,867,449 to Ecket et al. (discloses a metal fire block, bridging, and bracing element), U.S. Pat. No. 5,274,973 to Liang (discloses a notched stud spacer and mounting system), U.S. Pat. No. 6,021,618 to Elderson (discloses a notched stud spacer), U.S. Pat. No. 6,164,028 to Hughes (discloses a metallic bridging member), U.S. Pat. No. 6,983,569 to Rosenberg (discloses a notched stud spacer and bracing member together with a wall framing system), and U.S. Patent Application Publication No. 2007/023471 to Klein (discloses corrugated bracing strip). A problem associated with many of these devices is that they do not allow or accommodate for the placement of common in-wall plumbing and piping without additional cutting.

Although advances have been made over the years with respect to backing, spacing and bracing elements and systems used in wall assemblies, there is still a need in the art for new and improved framing elements that can be used as a backing, spacing, and cross-connecting bracing member in a wall assembly of a building. The present invention fulfills these needs and provides for further related advantages.

SUMMARY OF THE INVENTION

The present invention is directed to an extra strength backing stud and related wall assembly that consists essentially of: a plurality of sheet metal studs mounted upright at laterally and uniformly spaced intervals and between confronting footer and header tracks, each of the plurality of sheet metal studs having an outer flange surface coplanar with the outer flange surfaces of the other studs; an elongated C-shaped sheet-metal backing stud configured to support a wall-mounted fixture and horizontally engaged with the plurality of studs such that the outer coplanar flange surfaces of the plurality of studs abuts a planar web portion of the backing stud, with the web portion being flanked along its opposing horizontal edges by confronting and inwardly directed backing stud flanges, and with each backing stud flange being perpendicular to the web portion and having outer returns parallel to the web portion and confronting each other thereby defining a generally C-shaped cross-section profile, the elongated C-shaped backing stud further including a plurality of receiving notches positioned at laterally spaced apart intervals, with the plurality of studs being received into the plurality of receiving notches, the elongated C-shaped backing stud being further characterized in that (i) the ratio of the width of the web portion to the width of the backing stud flanges ranges from about eight to 16, (ii) the ratio of the width of the backing stud flanges to width of the outer returns is at least about one, and (iii) the ratio of the width of the plurality of studs to the width of the outer returns ranges from about six to eight; and a plurality of fasteners positioned along the elongated backing stud transverse from the plurality of studs.

These and other aspects of the present invention will become more evident upon reference to the following detailed description and attached drawings.

BRIEF DESCRIPTION OF THE DRAWINGS

The drawings are intended to be illustrative and symbolic representations of certain exemplary embodiments of the present invention. For purposes of clarity, like reference numerals have been used to designate like features throughout the several views of the drawings.

DETAILED DESCRIPTION OF THE INVENTION

Figure 1:
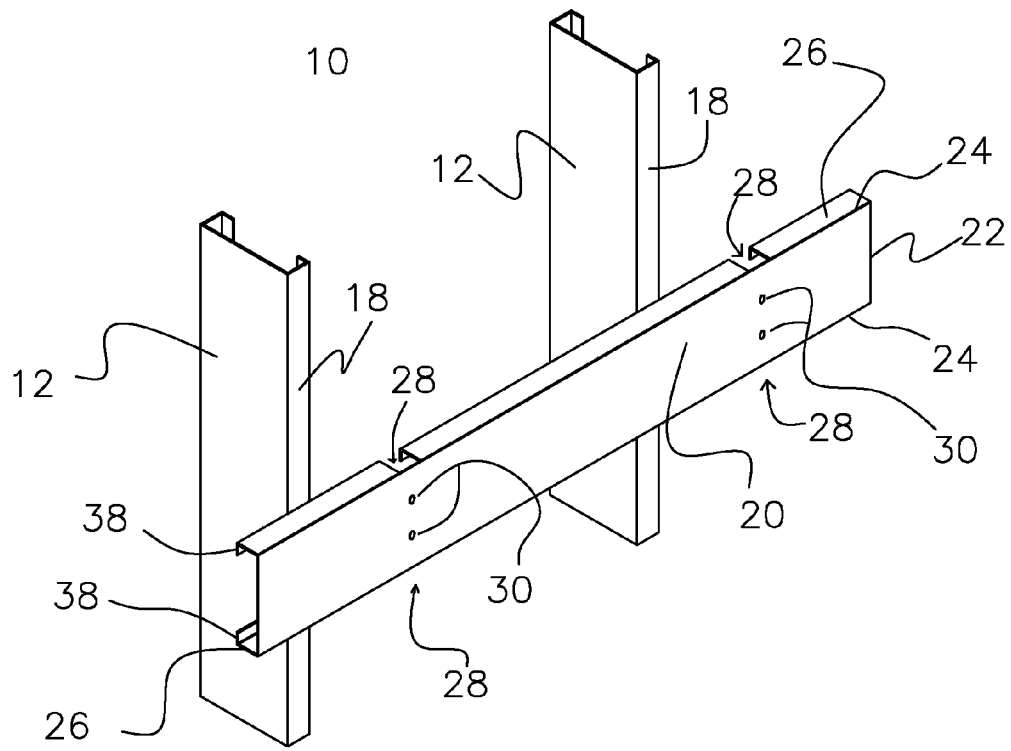
FIG. 1 illustrates a side perspective view of a section of a wall assembly in accordance with an embodiment of the present invention, wherein the wall assembly comprises a plurality of sheet metal studs and a backing stud (shown being spaced apart from the studs).
Figure 2:
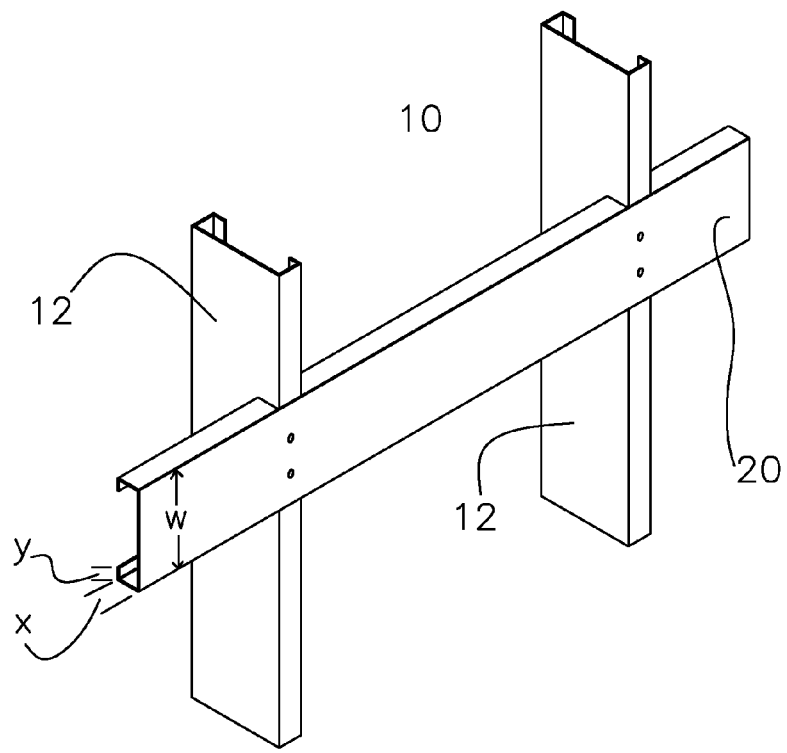
FIG. 2 illustrates a side perspective view of the section of the wall assembly of FIG. 1, but where the backing stud is engaged with the studs.
Figure 3:
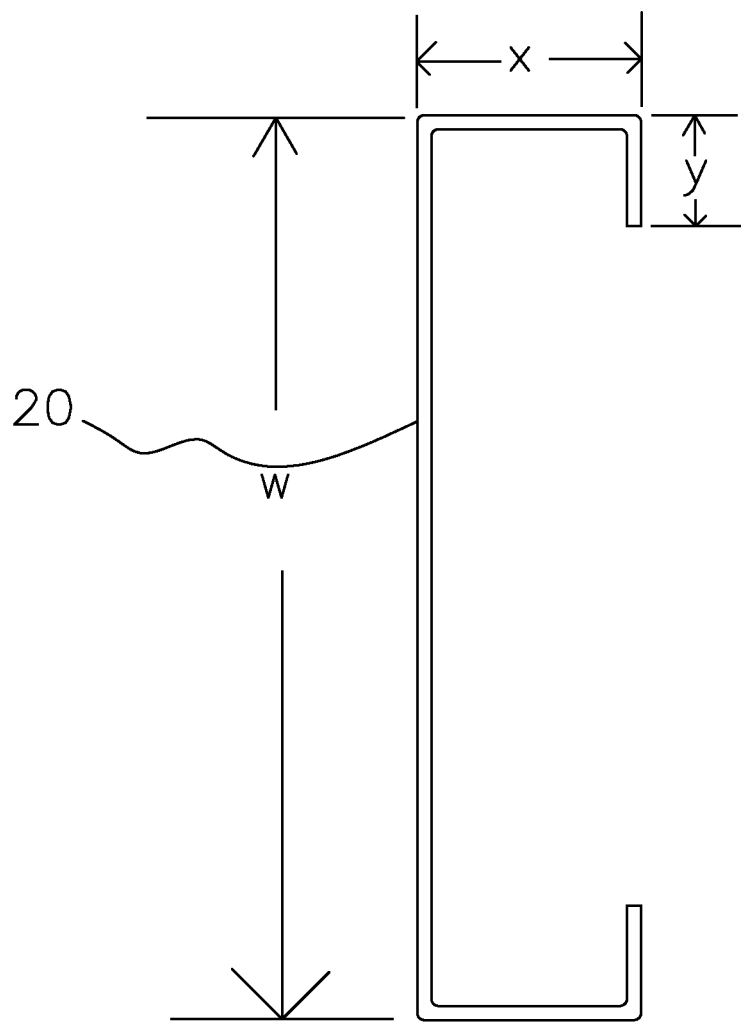
FIG. 3 illustrates a side view of a backing stud in accordance with an embodiment of the present invention.
Figure 4:
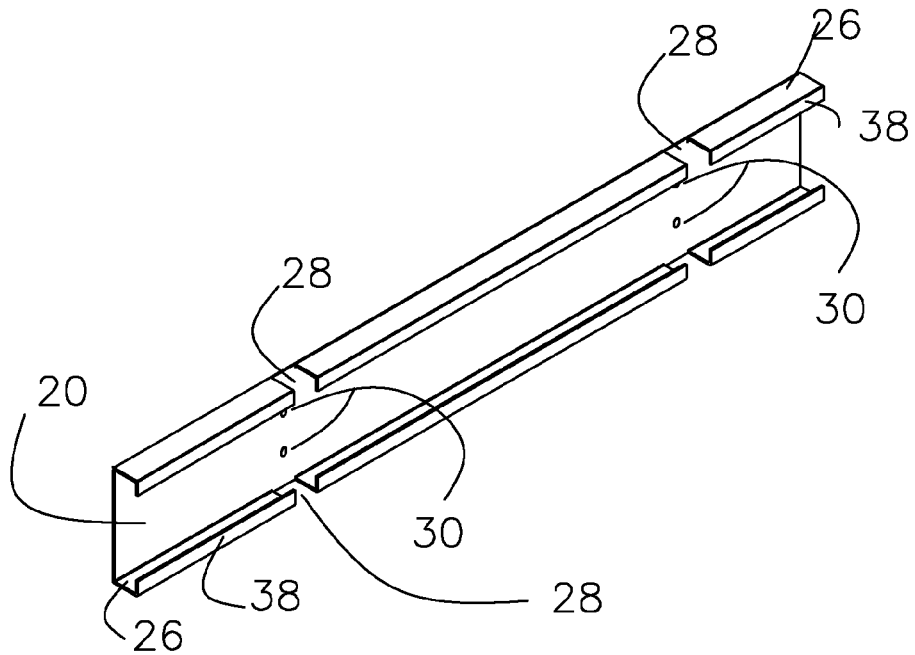
FIG. 4 illustrates a front perspective view of an isolated backing stud in accordance with an embodiment of the present invention.
Figure 5:
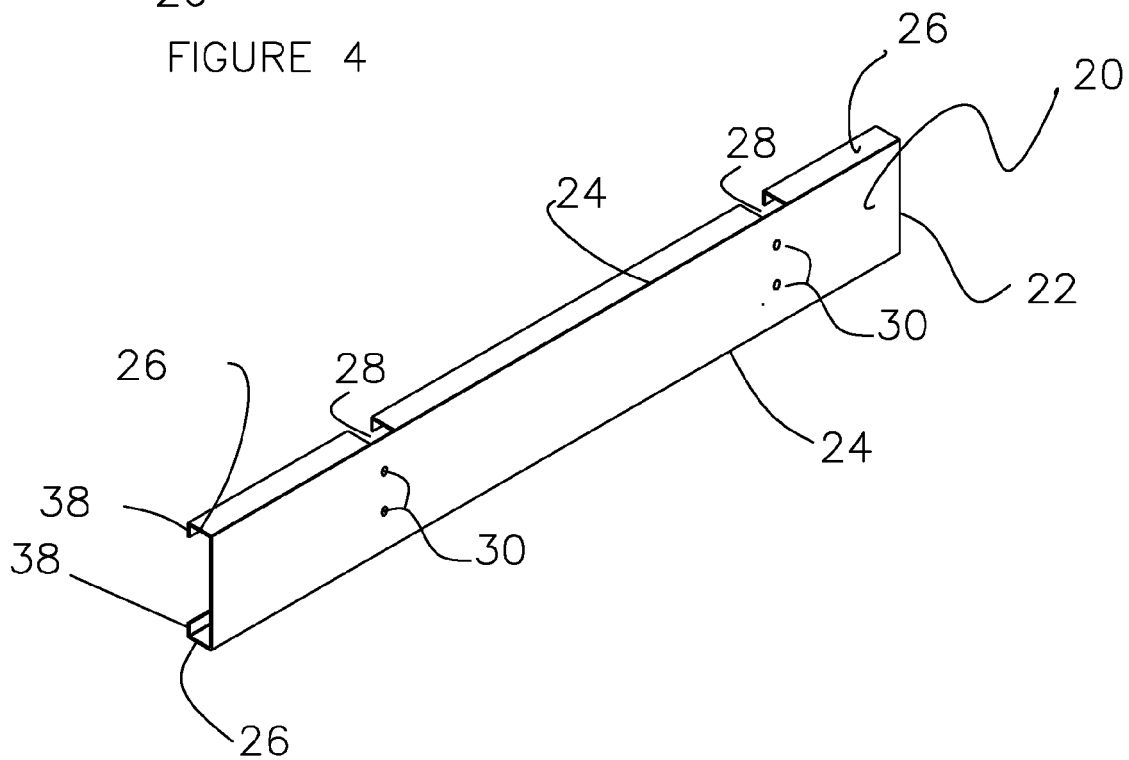
FIG. 5 illustrates a back perspective view of the isolated backing stud of FIG. 4.
Figure 6:
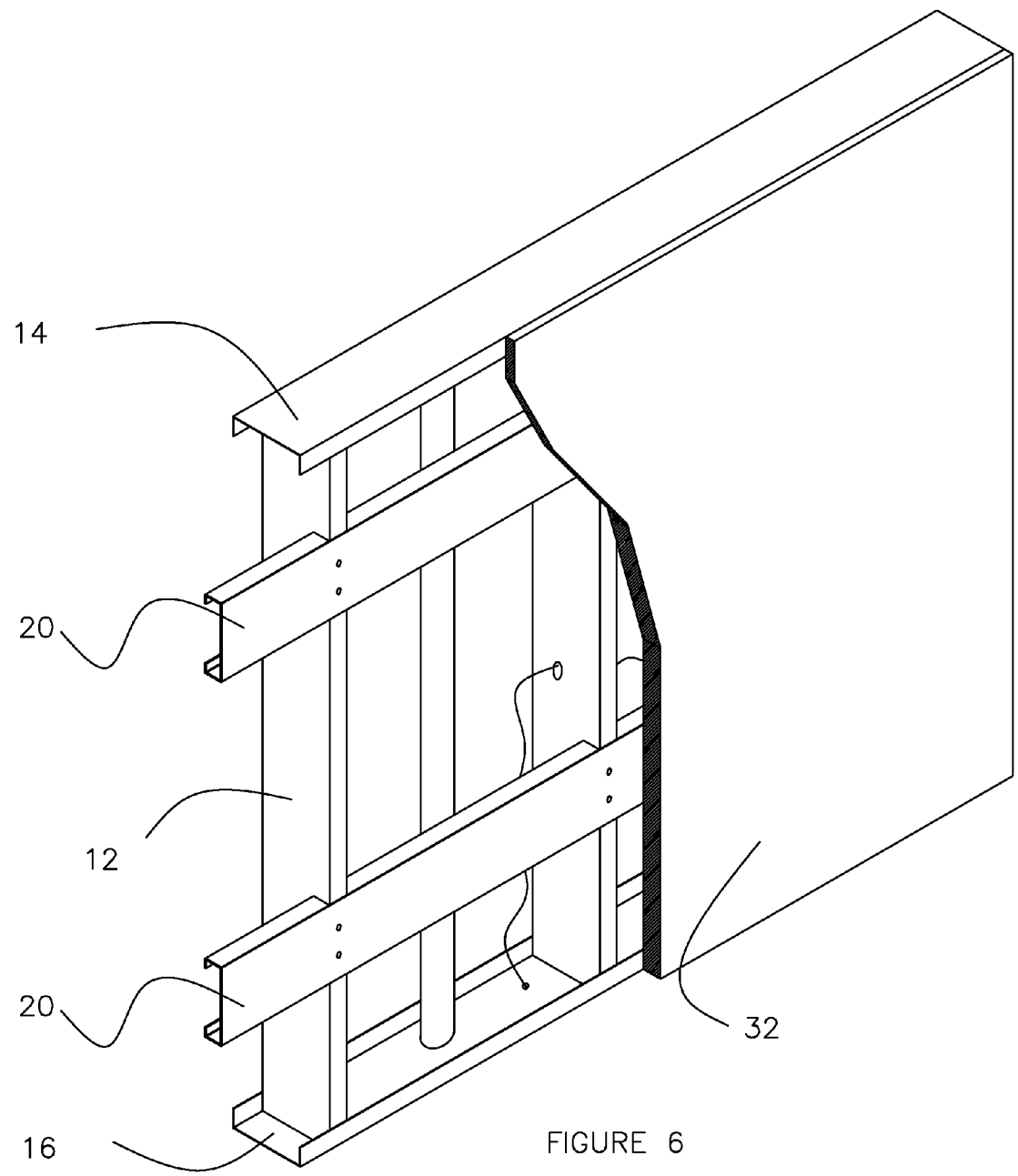
FIG. 6 illustrates a wall assembly in accordance with an embodiment of the present invention.

Referring now to the drawings wherein like reference numerals designate identical or corresponding elements, and more particularly to FIGS. 1 through 6, the present invention in one embodiment is directed to a sheet metal wall assembly 10. As shown, the wall assembly 10 includes a plurality of sheet metal studs 12 mounted upright at laterally spaced intervals and between confronting footer 16 and header tracks 14. Each stud 12 includes an outer flange surface 18 that is substantially coplanar with the outer flange surfaces 18 of the other studs 12. The sheet metal wall assembly 10 further includes an elongated C-shaped sheet metal backing stud 20 that is configured to support a wall-mounted fixture such as, for example, a grab bar, a hand rail, cabinetry, shelving, and the like (not shown). As best shown in FIG. 2, the backing stud 20 is horizontally engaged with the plurality of studs 12 such that the outer coplanar flange surfaces 18 of the plurality of studs 12 abut a planar web portion 22 (having a width is w) of the backing stud 20. The web portion 22 of the backing stud 20 is flanked along its opposing horizontal edges 24 by confronting and inwardly directed backing stud flanges 26. Each backing stud flange 26 (having a width x) is substantially perpendicular to the web portion 22 of the backing stud 20. In addition, the flanges 26 have outer returns 38 (having a width y) substantially parallel to the web portion 22 and confronting each other thereby defining a generally C-shaped cross-section profile (as best shown in FIG. 3).

The elongated C-shaped backing stud 12 further includes a plurality of receiving notches 28 positioned at laterally spaced apart intervals, with the plurality of studs 12 being received into the plurality of receiving slots 28. A plurality of fasteners 30 are positioned along the elongated backing stud 20 transverse from the plurality of studs 12 to thereby fasten the backing stud 20 to the plurality of studs 12 of the wall assembly 10. The elongated C-shaped backing stud 12 may be further characterized in that (i) the ratio of the width of the web portion w to the width of the backing stud flanges x ranges from about eight to 16 (w/x), (ii) the ratio of the width of the backing stud flanges x to width of the outer returns y is at least about one (x/y), and (iii) the ratio of the width of the plurality of studs w to the width of the outer returns y to the ranges from about six to eight (w/y). In this configuration, the wall assembly 10 is able to accommodate standard plumbing and piping within the wall assembly (and is able to do so without any cutting of the backing stud 20 because it is appropriately dimensioned).

For purposes of illustration and not limitation, the following Tables provide additional disclosure of the present invention.

TABLE 1

Backing Stud with 1 Inch Backing Stud Flange Specification
ALLOWABLE SECTION PROPERTIES - PER AISI DESIGN CRITERIA

| STEELTEC ESB MEMBER | GA | MIL | DEPTH (IN) | FLANGE (IN) | Fy (KSI) | Ixe (min) (IN$^3$) | Sxe (min) (IN$^3$) | Iye (min) (IN$^3$) | Sye (min) (IN$^3$) |
|---|---|---|---|---|---|---|---|---|---|
| 4-INCH, 20 GA | 20 | 33 | 4 | 1.00 | 33 | 0.522 | 0.261 | 0.033 | 0.046 |
| 4-INCH, 18 GA | 18 | 43 | 4 | 1.00 | 33 | 0.672 | 0.336 | 0.041 | 0.058 |
| 4-INCH, 16 GA | 16 | 54 | 4 | 1.00 | 50 | 0.823 | 0.411 | 0.050 | 0.070 |
| 4-INCH, 14 GA | 14 | 68 | 4 | 1.00 | 50 | 1.003 | 0.501 | 0.059 | 0.082 |
| 6-INCH, 20 GA | 20 | 33 | 6 | 1.00 | 33 | 1.371 | 0.445 | 0.036 | 0.047 |
| 6-INCH, 18 GA | 18 | 43 | 6 | 1.00 | 33 | 1.816 | 0.605 | 0.046 | 0.060 |
| 6-INCH, 16 GA | 16 | 54 | 6 | 1.00 | 50 | 2.236 | 0.745 | 0.056 | 0.072 |
| 6-INCH, 14 GA | 14 | 68 | 6 | 1.00 | 50 | 2.742 | 0.914 | 0.066 | 0.085 |
| 8-INCH, 20 GA | 20 | 33 | 8 | 1.00 | 33 | 2.687 | 0.626 | 0.037 | 0.047 |
| 8-INCH, 18 GA | 18 | 43 | 8 | 1.00 | 33 | 3.610 | 0.872 | 0.048 | 0.060 |
| 8-INCH, 16 GA | 16 | 54 | 8 | 1.00 | 50 | 4.492 | 1.092 | 0.058 | 0.072 |
| 8-INCH, 14 GA | 14 | 68 | 8 | 1.00 | 50 | 5.690 | 1.423 | 0.070 | 0.086 |

TABLE 2

Backing Stud with 1/2 Inch Backing Stud Flange Specification
ALLOWABLE SECTION PROPERTIES - PER AISI DESIGN CRITERIA

| Backing Stud width (w) thickness | GA | MIL | DEPTH (IN) | FLANGE (IN) | Fy (KSI) | Ixe (min) (IN$^3$) | Sxe (min) (IN$^3$) | Iye (min) (IN$^3$) | Sye (min) (IN$^3$) |
|---|---|---|---|---|---|---|---|---|---|
| 4-INCH, 20 GA | 20 | 33 | 4 | 0.50 | 33 | 0.386 | 0.193 | 0.007 | 0.018 |
| 4-INCH, 18 GA | 18 | 43 | 4 | 0.50 | 33 | 0.495 | 0.248 | 0.008 | 0.022 |
| 4-INCH, 16 GA | 16 | 54 | 4 | 0.50 | 50 | 0.603 | 0.301 | 0.009 | 0.025 |
| 4-INCH, 14 GA | 14 | 68 | 4 | 0.50 | 50 | 0.728 | 0.364 | 0.011 | 0.029 |
| 6-INCH, 20 GA | 20 | 33 | 6 | 0.50 | 33 | 1.085 | 0.357 | 0.007 | 0.018 |
| 6-INCH, 18 GA | 18 | 43 | 6 | 0.50 | 33 | 1.416 | 0.472 | 0.009 | 0.022 |
| 6-INCH, 16 GA | 16 | 54 | 6 | 0.50 | 50 | 1.736 | 0.579 | 0.010 | 0.026 |
| 6-INCH, 14 GA | 14 | 68 | 6 | 0.50 | 50 | 2.116 | 0.705 | 0.012 | 0.030 |
| 8-INCH, 20 GA | 20 | 33 | 8 | 0.50 | 33 | 2.214 | 0.526 | 0.007 | 0.018 |
| 8-INCH, 18 GA | 18 | 43 | 8 | 0.50 | 33 | 2.989 | 0.738 | 0.009 | 0.022 |
| 8-INCH, 16 GA | 16 | 54 | 8 | 0.50 | 50 | 3.727 | 0.932 | 0.011 | 0.026 |
| 8-INCH, 14 GA | 14 | 68 | 8 | 0.50 | 50 | 4.569 | 1.142 | 0.012 | 0.030 |

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A wall assembly comprising:

a plurality of sheet metal studs mounted vertically at laterally and uniformly spaced intervals and between confronting footer and header tracks, each of the plurality of sheet metal studs having an outer flange surface coplanar with the outer flange surfaces of the other studs, and wherein the outer flange surface of each of the plurality of studs is notch free; and an elongated C-shaped sheet-metal backing stud having a plurality of receiving notches positioned at laterally spaced apart intervals, wherein the backing stud is configured to support a wall mounted fixture and horizontally engaged with the plurality of vertical notch free studs such that the outer coplanar flange surfaces of the plurality of notch free studs abut an inner facing planar web portion of the backing stud, with the web portion being flanked along its opposing horizontal edges by confronting and inwardly directed backing stud flanges, and with each backing stud flange being perpendicular to the web portion and having outer returns parallel to the web portion and confronting each other thereby defining a generally C-shaped cross-section profile; and wherein the wall assembly defines an inner wall cavity positioned laterally adjacent to the backing stud, and wherein the inner wall cavity is dimensioned to accommodate standard plumbing and piping without any contact occurring between the backing stud and the standard plumbing and piping.

* * * * *